United States Patent
Lynch et al.

(10) Patent No.: US 7,880,729 B2
(45) Date of Patent: Feb. 1, 2011

(54) CENTER BUTTON ISOLATION RING

(75) Inventors: Brian Lynch, Cupertino, CA (US); Jan Moolsintong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 865 days.

(21) Appl. No.: 11/499,360

(22) Filed: Aug. 4, 2006

(65) Prior Publication Data

US 2007/0080952 A1   Apr. 12, 2007

Related U.S. Application Data

(60) Provisional application No. 60/725,841, filed on Oct. 11, 2005.

(51) Int. Cl.
*G06F 3/041* (2006.01)
(52) U.S. Cl. ...................................... 345/173; 345/156
(58) Field of Classification Search ................ 345/156, 345/173–178
See application file for complete search history.

(56) References Cited

U.S. PATENT DOCUMENTS

| | | | |
|---|---|---|---|
| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |

(Continued)

FOREIGN PATENT DOCUMENTS

CN            1139235              1/1997

(Continued)

OTHER PUBLICATIONS

"About Quicktip®" www.logicad3d.com/docs/qt.html, downloaded Apr. 8, 2002.

(Continued)

*Primary Examiner*—Srilakshmi K Kumar
(74) *Attorney, Agent, or Firm*—Morrison & Foerster LLP

(57) ABSTRACT

Selection button isolation arrangements for use with electronic devices are presented including: a selection pad forming a substantially planar surface disposed about a first axis, the selection pad having a pad top surface, the pad top surface configured to receive a user input, the selection pad configured to actuate a number of switches; a selection button substantially co-located with and disposed about the first axis for actuating a selection button switch, the selection button configured to receive a user input; and an annular isolation ring disposed about the first axis having a standoff for mechanically isolating the selection button such that the selection button switch is not actuated by the first user input. In some embodiments, the user input indicators are selected from the group consisting of: a menu selection, a play selection, a pause selection, a forward search selection, a backward search selection, and a stop selection.

19 Claims, 5 Drawing Sheets

U.S. PATENT DOCUMENTS

| | | |
|---|---|---|
| 4,246,452 A | 1/1981 | Chandler |
| 4,264,903 A | 4/1981 | Bigelow |
| 4,293,734 A | 10/1981 | Pepper, Jr. |
| D264,969 S | 6/1982 | McGourty |
| 4,380,007 A | 4/1983 | Steinegger |
| 4,380,040 A | 4/1983 | Posset |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A * | 8/1989 | Hon et al. .................. 600/591 |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,893 A | 12/1996 | Gaughan et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,943,044 A | 8/1999 | Martinelli et al. |
| 5,953,000 A | 9/1999 | Weirich |

| | | | | | | |
|---|---|---|---|---|---|---|
| 5,956,019 | A | 9/1999 | Bang et al. | 6,452,514 B1 | 9/2002 | Philipp |
| 5,959,611 | A | 9/1999 | Smailagic et al. | 6,465,271 B1 | 10/2002 | Ko et al. |
| 5,964,661 | A | 10/1999 | Dodge | 6,473,069 B1 | 10/2002 | Gerpheide |
| 5,973,668 | A | 10/1999 | Watanabe | 6,492,602 B2 | 12/2002 | Asai et al. |
| 6,000,000 | A | 12/1999 | Hawkins et al. | 6,492,979 B1 | 12/2002 | Kent et al. |
| 6,002,389 | A | 12/1999 | Kasser | 6,496,181 B1 | 12/2002 | Bomer et al. |
| 6,005,299 | A | 12/1999 | Hengst | 6,497,412 B1 | 12/2002 | Bramm |
| 6,025,832 | A | 2/2000 | Sudo et al. | D468,365 S | 1/2003 | Bransky et al. |
| 6,031,518 | A | 2/2000 | Adams et al. | D469,109 S | 1/2003 | Andre et al. |
| 6,034,672 | A | 3/2000 | Gaultier et al. | D472,245 S | 3/2003 | Andre et al. |
| 6,057,829 | A | 5/2000 | Silfvast | 6,546,231 B1 | 4/2003 | Someya et al. |
| 6,075,533 | A | 6/2000 | Chang | 6,587,091 B2 | 7/2003 | Serpa |
| 6,084,574 | A | 7/2000 | Bidiville | 6,606,244 B1 | 8/2003 | Liu et al. |
| D430,169 | S | 8/2000 | Scibora | 6,618,909 B1 | 9/2003 | Yang |
| 6,097,372 | A | 8/2000 | Suzuki | 6,636,197 B1 | 10/2003 | Goldenberg et al. |
| 6,104,790 | A | 8/2000 | Narayanaswami | 6,639,584 B1 | 10/2003 | Li |
| 6,122,526 | A | 9/2000 | Parulski et al. | 6,640,250 B1 | 10/2003 | Chang et al. |
| 6,124,587 | A | 9/2000 | Bidiville et al. | 6,650,975 B2 | 11/2003 | Ruffner |
| 6,128,006 | A | 10/2000 | Rosenberg et al. | D483,809 S | 12/2003 | Lim |
| 6,131,048 | A | 10/2000 | Sudo et al. | 6,664,951 B1 | 12/2003 | Fujii et al. |
| 6,141,068 | A | 10/2000 | Iijima | 6,677,927 B1 | 1/2004 | Bruck et al. |
| 6,147,856 | A | 11/2000 | Karidis | 6,678,891 B1 | 1/2004 | Wilcox et al. |
| 6,163,312 | A | 12/2000 | Furuya | 6,686,904 B1 | 2/2004 | Sherman et al. |
| 6,166,721 | A | 12/2000 | Kuroiwa et al. | 6,703,550 B2 | 3/2004 | Chu |
| 6,179,496 | B1 | 1/2001 | Chou | 6,724,817 B1 | 4/2004 | Simpson et al. |
| 6,181,322 | B1 | 1/2001 | Nanavati | 6,727,889 B2 | 4/2004 | Shaw |
| D437,860 | S | 2/2001 | Suzuki et al. | D489,731 S | 5/2004 | Huang |
| 6,188,391 | B1 | 2/2001 | Seely et al. | 6,738,045 B2 | 5/2004 | Hinckley et al. |
| 6,188,393 | B1 | 2/2001 | Shu | 6,750,803 B2 | 6/2004 | Yates et al. |
| 6,191,774 | B1 | 2/2001 | Schena et al. | 6,781,576 B2 | 8/2004 | Tamura |
| 6,198,054 | B1 | 3/2001 | Janniere | 6,788,288 B2 | 9/2004 | Ano |
| 6,198,473 | B1 | 3/2001 | Armstrong | 6,791,533 B2 | 9/2004 | Su |
| 6,211,861 | B1 | 4/2001 | Rosenberg et al. | 6,795,057 B2 | 9/2004 | Gordon |
| 6,219,038 | B1 | 4/2001 | Cho | D497,618 S | 10/2004 | Andre et al. |
| 6,222,528 | B1 | 4/2001 | Gerpheide et al. | 6,810,271 B1 | 10/2004 | Wood et al. |
| D442,592 | S | 5/2001 | Ledbetter et al. | 6,844,872 B1 | 1/2005 | Farag et al. |
| 6,225,976 | B1 | 5/2001 | Yates et al. | 6,865,718 B2 | 3/2005 | Levi |
| 6,225,980 | B1 | 5/2001 | Weiss et al. | 6,886,842 B2 | 5/2005 | Vey et al. |
| 6,226,534 | B1 | 5/2001 | Aizawa | 6,894,916 B2 | 5/2005 | Reohr et al. |
| 6,227,966 | B1 | 5/2001 | Yokoi | D506,476 S | 6/2005 | Andre et al. |
| D443,616 | S | 6/2001 | Fisher et al. | 6,922,189 B2 | 7/2005 | Fujiyoshi |
| 6,243,078 | B1 | 6/2001 | Rosenberg | 6,930,494 B2 | 8/2005 | Tesdahl et al. |
| 6,243,080 | B1 | 6/2001 | Molne | 6,958,614 B2 | 10/2005 | Morimoto |
| 6,243,646 | B1 | 6/2001 | Ozaki et al. | 6,977,808 B2 | 12/2005 | Lam et al. |
| 6,248,017 | B1 | 6/2001 | Roach | 6,978,127 B1 | 12/2005 | Bulthuis et al. |
| 6,254,477 | B1 | 7/2001 | Sasaki et al. | 7,006,077 B1 | 2/2006 | Uusimäki |
| 6,256,011 | B1 | 7/2001 | Culver | 7,019,225 B2 | 3/2006 | Matsumoto et al. |
| 6,259,491 | B1 | 7/2001 | Ekedahl et al. | 7,046,230 B2 | 5/2006 | Zadesky et al. |
| 6,262,717 | B1 | 7/2001 | Donohue et al. | 7,069,044 B2 | 6/2006 | Okada et al. |
| 6,262,785 | B1 | 7/2001 | Kim | 7,084,856 B2 | 8/2006 | Huppi |
| 6,266,050 | B1 | 7/2001 | Oh et al. | 7,113,196 B2 | 9/2006 | Kerr |
| 6,285,211 | B1 | 9/2001 | Sample et al. | 7,119,792 B1 | 10/2006 | Andre et al. |
| D448,810 | S | 10/2001 | Goto | 7,215,319 B2 | 5/2007 | Kamijo et al. |
| 6,297,795 | B1 | 10/2001 | Kato et al. | 7,233,318 B1 | 6/2007 | Farag et al. |
| 6,297,811 | B1 | 10/2001 | Kent et al. | 7,236,154 B1 | 6/2007 | Kerr et al. |
| 6,300,946 | B1 | 10/2001 | Lincke et al. | 7,253,643 B1 | 8/2007 | Seguine |
| 6,307,539 | B2 | 10/2001 | Suzuki | 7,279,647 B2 | 10/2007 | Philipp |
| D450,713 | S | 11/2001 | Masamitsu et al. | 7,310,089 B2 | 12/2007 | Baker et al. |
| 6,314,483 | B1 | 11/2001 | Goto et al. | 7,312,785 B2 | 12/2007 | Tsuk et al. |
| 6,321,441 | B1 | 11/2001 | Davidson et al. | 7,382,139 B2 | 6/2008 | Mackey |
| 6,323,845 | B1 | 11/2001 | Robbins | 7,394,038 B2 | 7/2008 | Chang |
| D452,250 | S | 12/2001 | Chan | 7,395,081 B2 | 7/2008 | Bonnelykke Kristensen et al. |
| 6,340,800 | B1 | 1/2002 | Zhai et al. | 7,397,467 B2 | 7/2008 | Park et al. |
| D454,568 | S | 3/2002 | Andre et al. | 7,439,963 B2 | 10/2008 | Geaghan et al. |
| 6,357,887 | B1 | 3/2002 | Novak | 7,466,307 B2 | 12/2008 | Trent et al. |
| D455,793 | S | 4/2002 | Lin | 7,502,016 B2 | 3/2009 | Trent, Jr. et al. |
| 6,373,265 | B1 | 4/2002 | Morimoto et al. | 7,503,193 B2 | 3/2009 | Schoene et al. |
| 6,373,470 | B1 | 4/2002 | Andre et al. | 7,593,782 B2 * | 9/2009 | Jobs et al. ............ 700/94 |
| 6,377,530 | B1 | 4/2002 | Burrows | 7,645,955 B2 | 1/2010 | Huang et al. |
| 6,396,523 | B1 | 5/2002 | Segal et al. | 2001/0011991 A1 | 8/2001 | Wang et al. |
| 6,424,338 | B1 | 7/2002 | Anderson | 2001/0033270 A1 | 10/2001 | Osawa et al. |
| 6,429,846 | B2 | 8/2002 | Rosenberg et al. | 2001/0043545 A1 | 11/2001 | Aratani |
| 6,429,852 | B1 | 8/2002 | Adams et al. | 2001/0050673 A1 | 12/2001 | Davenport |

| | | | | | | |
|---|---|---|---|---|---|---|
| 2001/0051046 | A1 | 12/2001 | Watanabe et al. | 2006/0174568 A1 | 8/2006 | Kinoshita et al. |
| 2002/0011993 | A1 | 1/2002 | Lui et al. | 2006/0181517 A1 | 8/2006 | Zadesky et al. |
| 2002/0027547 | A1 | 3/2002 | Kamijo | 2006/0197750 A1 | 9/2006 | Kerr et al. |
| 2002/0030665 | A1 | 3/2002 | Ano | 2006/0232557 A1 | 10/2006 | Fallot-Burghardt |
| 2002/0033848 | A1 | 3/2002 | Sciammarella et al. | 2006/0236262 A1 | 10/2006 | Bathiche et al. |
| 2002/0039493 | A1 | 4/2002 | Tanaka | 2006/0250377 A1 | 11/2006 | Zadesky et al. |
| 2002/0045960 | A1 | 4/2002 | Phillips et al. | 2006/0274042 A1 | 12/2006 | Krah et al. |
| 2002/0071550 | A1 | 6/2002 | Pletikosa | 2006/0274905 A1 | 12/2006 | Lindahl et al. |
| 2002/0089545 | A1 | 7/2002 | Montalcini | 2006/0279896 A1 | 12/2006 | Bruwer |
| 2002/0103796 | A1 | 8/2002 | Hartley | 2006/0284836 A1 | 12/2006 | Philipp |
| 2002/0118131 | A1 | 8/2002 | Yates et al. | 2007/0013671 A1 | 1/2007 | Zadesky et al. |
| 2002/0118169 | A1 | 8/2002 | Hinckley et al. | 2007/0018970 A1 | 1/2007 | Tabasso et al. |
| 2002/0145594 | A1 | 10/2002 | Derocher | 2007/0052044 A1 | 3/2007 | Forsblad et al. |
| 2002/0154090 | A1 | 10/2002 | Lin | 2007/0052691 A1 | 3/2007 | Zadesky et al. |
| 2002/0158844 | A1 | 10/2002 | McLoone et al. | 2007/0080936 A1 | 4/2007 | Tsuk et al. |
| 2002/0164156 | A1 | 11/2002 | Bilbrey | 2007/0080938 A1 | 4/2007 | Robbin et al. |
| 2002/0180701 | A1 | 12/2002 | Hayama et al. | 2007/0083822 A1 | 4/2007 | Robbin et al. |
| 2002/0196239 | A1 | 12/2002 | Lee | 2007/0085841 A1 | 4/2007 | Tsuk et al. |
| 2003/0002246 | A1 | 1/2003 | Kerr | 2007/0097086 A1 | 5/2007 | Battles et al. |
| 2003/0025679 | A1 | 2/2003 | Taylor et al. | 2007/0120834 A1 | 5/2007 | Boillot |
| 2003/0028346 | A1 | 2/2003 | Sinclair et al. | 2007/0126696 A1 | 6/2007 | Boillot |
| 2003/0043121 | A1 | 3/2003 | Chen | 2007/0152975 A1 | 7/2007 | Ogihara |
| 2003/0043174 | A1 | 3/2003 | Hinckley et al. | 2007/0152977 A1 | 7/2007 | Ng et al. |
| 2003/0050092 | A1 | 3/2003 | Yun | 2007/0152983 A1 | 7/2007 | McKillop et al. |
| 2003/0076301 | A1 | 4/2003 | Tsuk et al. | 2007/0155434 A1 | 7/2007 | Jobs et al. |
| 2003/0076303 | A1 | 4/2003 | Huppi | 2007/0242057 A1 | 10/2007 | Zadesky et al. |
| 2003/0076306 | A1 | 4/2003 | Zadesky et al. | 2007/0247421 A1 | 10/2007 | Orsley et al. |
| 2003/0091377 | A1 | 5/2003 | Hsu et al. | 2007/0247443 A1 | 10/2007 | Philipp |
| 2003/0095095 | A1 | 5/2003 | Pihlaja | 2007/0273671 A1 | 11/2007 | Zadesky et al. |
| 2003/0095096 | A1 | 5/2003 | Robbin et al. | 2007/0276525 A1 | 11/2007 | Zadesky et al. |
| 2003/0098851 | A1 | 5/2003 | Brink | 2007/0279394 A1 | 12/2007 | Lampell |
| 2003/0103043 | A1 | 6/2003 | Mulligan et al. | 2007/0290990 A1 | 12/2007 | Robbin et al. |
| 2003/0135292 | A1 | 7/2003 | Husgafvel et al. | 2007/0291016 A1 | 12/2007 | Philipp |
| 2003/0142081 | A1 | 7/2003 | Iizuka et al. | 2007/0296709 A1 | 12/2007 | GuangHai |
| 2003/0184517 | A1 | 10/2003 | Senzui et al. | 2008/0006453 A1 | 1/2008 | Hotelling et al. |
| 2003/0197740 | A1 | 10/2003 | Reponen | 2008/0006454 A1 | 1/2008 | Hotelling |
| 2003/0206202 | A1 | 11/2003 | Moriya | 2008/0007533 A1 | 1/2008 | Hotelling et al. |
| 2003/0210537 | A1 | 11/2003 | Engelmann | 2008/0007539 A1 | 1/2008 | Hotelling et al. |
| 2004/0027341 | A1 | 2/2004 | Derocher | 2008/0012837 A1 | 1/2008 | Marriott et al. |
| 2004/0080682 | A1 | 4/2004 | Dalton | 2008/0018615 A1 | 1/2008 | Zadesky et al. |
| 2004/0109357 | A1 | 6/2004 | Cernea et al. | 2008/0018616 A1 | 1/2008 | Lampell et al. |
| 2004/0150619 | A1 | 8/2004 | Baudisch et al. | 2008/0018617 A1 | 1/2008 | Ng et al. |
| 2004/0156192 | A1 | 8/2004 | Kerr et al. | 2008/0036473 A1 | 2/2008 | Jansson |
| 2004/0178997 | A1 | 9/2004 | Gillespie et al. | 2008/0036734 A1 | 2/2008 | Forsblad et al. |
| 2004/0215986 | A1 | 10/2004 | Shakkarwar | 2008/0060925 A1 | 3/2008 | Weber et al. |
| 2004/0224638 | A1 | 11/2004 | Fadell et al. | 2008/0079699 A1 | 4/2008 | Mackey |
| 2004/0239622 | A1 | 12/2004 | Proctor et al. | 2008/0087476 A1 | 4/2008 | Prest |
| 2004/0252109 | A1 | 12/2004 | Trent, Jr. et al. | 2008/0088582 A1 | 4/2008 | Prest |
| 2004/0253989 | A1 | 12/2004 | Tupler et al. | 2008/0088596 A1 | 4/2008 | Prest |
| 2004/0263388 | A1 | 12/2004 | Krumm et al. | 2008/0088597 A1 | 4/2008 | Prest |
| 2004/0267874 | A1 | 12/2004 | Westberg et al. | 2008/0088600 A1 | 4/2008 | Prest |
| 2005/0012644 | A1 | 1/2005 | Hurst et al. | 2008/0094352 A1 | 4/2008 | Tsuk et al. |
| 2005/0017957 | A1 | 1/2005 | Yi | 2008/0098330 A1 | 4/2008 | Tsuk et al. |
| 2005/0030048 | A1 | 2/2005 | Bolender | 2008/0110739 A1 | 5/2008 | Peng et al. |
| 2005/0052425 | A1 | 3/2005 | Zadesky et al. | 2008/0111795 A1 | 5/2008 | Bollinger |
| 2005/0052426 | A1 | 3/2005 | Hagermoser et al. | 2008/0264767 A1 | 10/2008 | Chen et al. |
| 2005/0052429 | A1 | 3/2005 | Philipp | 2008/0284742 A1 | 11/2008 | Prest |
| 2005/0068304 | A1 | 3/2005 | Lewis et al. | 2009/0021267 A1 | 1/2009 | Golovchenko et al. |
| 2005/0083299 | A1 | 4/2005 | Nagasaka | 2009/0026558 A1 | 1/2009 | Bauer et al. |
| 2005/0083307 | A1 | 4/2005 | Aufderheide | 2009/0033635 A1 | 2/2009 | Wai |
| 2005/0104867 | A1 | 5/2005 | Westerman et al. | 2009/0058687 A1 | 3/2009 | Rothkopf et al. |
| 2005/0110768 | A1 | 5/2005 | Marriott et al. | 2009/0058801 A1 | 3/2009 | Bull |
| 2005/0140657 | A1 | 6/2005 | Park et al. | 2009/0058802 A1 | 3/2009 | Orsley et al. |
| 2005/0156881 | A1 | 7/2005 | Trent, Jr. et al. | 2009/0073130 A1 | 3/2009 | Weber et al. |
| 2005/0162402 | A1 | 7/2005 | Watanachote | 2009/0078551 A1 | 3/2009 | Kang |
| 2005/0204309 | A1 | 9/2005 | Szeto | 2009/0141046 A1 | 6/2009 | Rathnam et al. |
| 2005/0237308 | A1 | 10/2005 | Autio et al. | 2009/0179854 A1 | 7/2009 | Weber et al. |
| 2006/0026521 | A1 | 2/2006 | Hotelling et al. | 2009/0197059 A1 | 8/2009 | Weber et al. |
| 2006/0032680 | A1 | 2/2006 | Elias et al. | 2009/0229892 A1 | 9/2009 | Fisher et al. |
| 2006/0038791 | A1 | 2/2006 | Mackey | 2009/0273573 A1 | 11/2009 | Hotelling |
| 2006/0097991 | A1 | 5/2006 | Hotelling et al. | 2010/0058251 A1 | 3/2010 | Rottler et al. |
| 2006/0131156 | A1 | 6/2006 | Voelckers | 2010/0060568 A1 | 3/2010 | Fisher et al. |
| 2006/0143574 | A1 | 6/2006 | Ito et al. | 2010/0073319 A1 | 3/2010 | Lyon et al. |

| | | | | | |
|---|---|---|---|---|---|
| 2010/0149127 A1 | 6/2010 | Fisher et al. | JP | 5-298955 | 11/1993 |
| | | | JP | 5-325723 | 12/1993 |
| FOREIGN PATENT DOCUMENTS | | | JP | 6-20570 | 1/1994 |
| CN | 1455615 | 11/2003 | JP | 6-084428 | 3/1994 |
| CN | 1499356 | 5/2004 | JP | 6-089636 | 3/1994 |
| DE | 3615742 | 11/1987 | JP | 6-96639 | 4/1994 |
| DE | 19722636 | 12/1998 | JP | 6-111695 | 4/1994 |
| DE | 10022537 | 11/2000 | JP | 6-139879 | 5/1994 |
| DE | 20019074 U1 | 2/2001 | JP | 6-187078 | 7/1994 |
| DE | 10 2004 043 663 | 4/2006 | JP | 6-208433 | 7/1994 |
| EP | 0178157 | 4/1986 | JP | 6-267382 | 9/1994 |
| EP | 0419145 A1 | 3/1991 | JP | 6-283993 | 10/1994 |
| EP | 0 498 540 | 8/1992 | JP | 6-333459 | 12/1994 |
| EP | 0 521 683 | 1/1993 | JP | 7-107574 | 4/1995 |
| EP | 0 674 288 | 9/1995 | JP | 7-41882 | 7/1995 |
| EP | 0 731 407 | 9/1996 | JP | 7-201249 | 8/1995 |
| EP | 0 551 778 B1 | 1/1997 | JP | 7-201256 | 8/1995 |
| EP | 0 880 091 A2 | 11/1998 | JP | 7-253838 | 10/1995 |
| EP | 1 026 713 | 8/2000 | JP | 7-261899 | 10/1995 |
| EP | 1 081 922 A2 | 3/2001 | JP | 7-261922 | 10/1995 |
| EP | 1 098 241 A2 | 5/2001 | JP | 7-296670 | 11/1995 |
| EP | 1 133 057 | 9/2001 | JP | 7-319001 | 12/1995 |
| EP | 1 162 826 A2 | 12/2001 | JP | 8-016292 | 1/1996 |
| EP | 1 168 396 | 1/2002 | JP | 8-115158 | 5/1996 |
| EP | 1 205 836 A2 | 5/2002 | JP | 8-203387 | 8/1996 |
| EP | 1 244 053 | 9/2002 | JP | 8-293226 | 11/1996 |
| EP | 1 251 455 A2 | 10/2002 | JP | 8-298045 | 11/1996 |
| EP | 1263193 | 12/2002 | JP | 8-299541 | 11/1996 |
| EP | 1347481 | 9/2003 | JP | 8-316664 | 11/1996 |
| EP | 1376326 | 1/2004 | JP | 9-044289 | 2/1997 |
| EP | 1 467 392 | 10/2004 | JP | 9-069023 | 3/1997 |
| EP | 1 482 401 | 12/2004 | JP | 9-128148 | 5/1997 |
| EP | 1 496 467 | 1/2005 | JP | 9-134248 | 5/1997 |
| EP | 1 517 228 | 3/2005 | JP | 9-218747 | 8/1997 |
| EP | 1 542 437 A2 | 6/2005 | JP | 9-230993 | 9/1997 |
| EP | 1 589 407 | 10/2005 | JP | 9-231858 | 9/1997 |
| EP | 1 784 058 A2 | 5/2007 | JP | 9-233161 | 9/1997 |
| EP | 1 841 188 | 10/2007 | JP | 9-251347 | 9/1997 |
| EP | 1850218 | 10/2007 | JP | 9-258895 | 10/1997 |
| EP | 1 876 711 | 1/2008 | JP | 9-288926 | 11/1997 |
| FR | 2 686 440 | 7/1993 | JP | 9-512979 | 12/1997 |
| GB | 2015167 | 9/1979 | JP | 10-63467 | 3/1998 |
| GB | 2072389 | 9/1981 | JP | 10-74127 | 3/1998 |
| GB | 2315186 | 1/1998 | JP | 10-074429 | 3/1998 |
| GB | 2333215 | 7/1999 | JP | 10-198507 | 7/1998 |
| GB | 2391060 | 1/2004 | JP | 10-227878 | 8/1998 |
| GB | 2 402 105 | 12/2004 | JP | 10-240693 | 9/1998 |
| JP | 57-95722 | 6/1982 | JP | 10-320322 | 12/1998 |
| JP | 57-97626 | 6/1982 | JP | 10-326149 | 12/1998 |
| JP | 61-117619 | 6/1986 | JP | 11-24834 | 1/1999 |
| JP | 61-124009 | 6/1986 | JP | 11-184607 | 7/1999 |
| JP | 63-20411 | 1/1988 | JP | 11-194863 | 7/1999 |
| JP | 63-106826 | 5/1988 | JP | 11-194872 | 7/1999 |
| JP | 63-181022 | 7/1988 | JP | 11-194882 | 7/1999 |
| JP | 63-298518 | 12/1988 | JP | 11-194883 | 7/1999 |
| JP | 03-57617 | 6/1991 | JP | 11-194891 | 7/1999 |
| JP | 3-192418 | 8/1991 | JP | 11-195353 | 7/1999 |
| JP | 04-32920 | 2/1992 | JP | 11-203045 | 7/1999 |
| JP | 4-205408 | 7/1992 | JP | 11-212725 | 8/1999 |
| JP | 5-041135 | 2/1993 | JP | 11-272378 | 10/1999 |
| JP | 5-080938 | 4/1993 | JP | 11-338628 | 12/1999 |
| JP | 5-101741 | 4/1993 | JP | 2000-215549 | 8/2000 |
| JP | 5-36623 | 5/1993 | JP | 2000-267786 | 9/2000 |
| JP | 5-189110 | 7/1993 | JP | 2000-267797 | 9/2000 |
| JP | 5-205565 | 8/1993 | JP | 2000-353045 | 12/2000 |
| JP | 5-211021 | 8/1993 | JP | 2001-11769 | 1/2001 |
| JP | 5-217464 | 8/1993 | JP | 2001-22508 | 1/2001 |
| JP | 5-233141 | 9/1993 | JP | 2001-184158 | 7/2001 |
| JP | 5-262276 | 10/1993 | JP | 3085481 | 2/2002 |
| JP | 5-265656 | 10/1993 | JP | 2002-215311 | 8/2002 |
| JP | 5-274956 | 10/1993 | JP | 2003-150303 | 5/2003 |
| JP | 5-289811 | 11/1993 | JP | 2003-517674 | 5/2003 |
| | | | JP | 2003-280799 | 10/2003 |

| | | |
|---|---|---|
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO-03/044956 | 5/2003 |
| WO | WO-03/025960 | 9/2003 |
| WO | WO-03/088176 | 10/2003 |
| WO | WO-03/090008 | 10/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 A2 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/045414 | 4/2008 |
| WO | WO-2008/045833 | 4/2008 |

OTHER PUBLICATIONS

"Alps Electric introduces the GlidePoint Wave Keyboard; combines a gently curved design with Alps' advanced GlidePoint Technology," Business Wire (Oct. 21, 1996).

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseunn/2006p.html, downloaded Feb. 28, 2007, pp. 1-15.

"Der Klangmeister," Connect Magazine, Aug. 1998.

"Design News literature plus," Design News 51(24) (Dec. 18, 1995).

"Manufactures," Laser Focus World, Buyers Guide '96, 31(12) (Dec. 1995).

"National Design Engineering Show," Design News 52(5) (Mar. 4, 1996).

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

"Preview of exhibitor booths at the Philadelphia show," Air Conditioning, Heating & News 200(2) (Jan. 13, 1997).

"Product news," Design News 53(11) (Jun. 9, 1997).

"Product news," Design News 53(9) (May 5, 1997).

"Product Overview—ErgoCommander®," www.logicad3d.com/products/ErgoCommander.htm, downloaded Apr. 8, 2002.

"Product Overview—SpaceMouse® Classic" www.logicad3d.com/products/Classic.htm, downloaded Apr. 8, 2002.

"Synaptics Tough Pad Interfacing Guide," Second Edition, Mar. 25, 1998, Synaptics, Inc., San Jose, CA, pp. 1-90.

"System Service and Troubleshooting Manual," www.dsplib.com/intv/Master, downloaded Dec. 11, 2002.

"Triax Custom Controllers due; Video Game Controllers," HFD-The Weekly Home Furnishing Newspaper 67(1) (Jan. 4, 1993).

"Diamond Multimedia Announces Rio PMP300 Portable MP3 Music Player," located at http://news.harmony-central.com/Newp/1998/Rio-PMP300.html visited on May 5, 2008. (4 pages).

"Touchpad," Notebook PC Manual, ACER Information Co. Ltd., Feb. 16, 2005, pp. 11-12.

Ahl, David, "Controller Update," Creative Computing Vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct. 1994).

Baig, E.C., "Your PC Just Might Need a Mouse," U.S. News & World Report 108(22) (Jun. 4, 1990).

Bang & Olufsen Telecom a/s, "BeoCom 6000 User Guide 2000."

Bartimo, Jim, "The Portables: Travelling Quickly," Computerworld (Nov. 14, 1983).

BeoCom 6000, Sales Training Brochure, date unknown.

Boling, Douglas (1993) "Programming Microsoft Windows CE.NET," p. 109.

Bollinger, U.S. Appl. No. 60/858,404, filed Nov. 13, 2006, entitled "Method of Capacitively Sensing Finger Position"; 13 pages.

Bray, "Phosphors help switch on xenon," Physics in Action, pp. 1-3, Apr. 1999.

Brink et al., "Pumped-up portables," U.S. News & World Report 116(21) (May 30, 1994).

Brown et al., "Windows on Tablets as a Means of Achieving Virtual Input Devices," Human-Computer Interaction—Interact '90 (1990).

Buxton et al., "Issues and Techniques in Touch-Sensitive Tablet Input," Computer Graphics 19(3), Proceedings of SIGGRAPH '85 (1985).

Chapweske, Adam "PS/2 Mouse/Keyboard Protocol," 1999, http://panda.cs.ndsu.nodak.edu/~achapwes/PICmicro/PS2/ps2.htm.

Chen et al., "A Study in Interactive 3-D Rotation Using 2-D Control Devices," Computer Graphics 22(4) (Aug. 1988).

Chinese Office Action issue Dec. 29, 2006, directed to CN Application No. 200510103886.3, 25 pages.

De Meyer, Kevin, "Crystal Optical Mouse," Feb. 14, 2002, Heatseekerz, Web Article 19.

Elias et al., U.S. Office Action mailed Aug. 4, 2009, directed to U.S. Appl. No. 11/203,692; 12 pages.

Elias et al., U.S. Office Action mailed Feb. 23, 2009, directed to U.S. Appl. No. 11/203,692; 13 pages.

Elias et al., U.S. Office Action mailed Sep. 17, 2008, directed to U.S. Appl. No. 11/203,692; 8 pages.

Elias et al., U.S. Appl. No. 60/522,107, filed Aug. 16, 2004, entitled, "A Method for Increasing the Spatial Resolution of Touch Sensitive Devices"; 15 pages.

Evans et al., "Tablet-based Valuators that Provide One, Two, or Three Degrees of Freedom," Computer Grahics 15(3) (Aug. 1981).

EVB Elektronik "TSOP6238 IR Receiver Modules for Infrared Remote Control Systems" dated Jan. 2004 1 page.

Fiore, "Zen Touchpad," Cornell University, May 2000.

Fisher et al., U.S. Appl. No. 61/036,804, filed Mar. 14, 2008 entitled "Switchable Sensor Configurations"; 46 pages.

Forsblad et al., U.S. Office Action mailed Jan. 26, 2009, directed to U.S. Appl. No. 11/355,022; 15 pages.

Forsblad et al., U.S. Office Action mailed Jan. 27, 2009, directed to U.S. Appl. No. 11/882,421; 15 pages.
Forsblad et al., U.S. Office Action mailed Jun. 25, 2009, directed to U.S. Appl. No. 11/355,022; 18 pages.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Grignon et al., U.S. Appl. No. 60/755,656, filed Dec. 30, 2005, entitled "Touch Pad with Feedback"; 109 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/482,420; 17 pages.
Hotelling, U.S. Office Action mailed Sep. 1, 2009, directed to U.S. Appl. No. 11/482,286; 14 pages.
Hotelling, U.S. Appl. No. 60/658,777 titled "Multi-Functional Handheld Device," filed Mar. 4, 2005; 68 pages.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. "Development of the Touch Switches with the Click Response," Koukuu Denshi Gihou No. 17, pp. 44-48 (Mar. 1994) (published by the Japan Aviation Electronics Industry, Ltd.).
Kobayashi et al. (1997) "Dynamic Soundscape: Mapping Time to Space for Audio Browsing," Computer Human Interaction: 16 pages.
Lampell et al., U.S. Appl. No. 60/810,423 filed Jun. 2, 2006, entitled "Techniques for Interactive Input to Portable Electronic Devices"; 53 pages.
Lampell, U.S. Office Action mailed Sep. 15, 2009, directed to U.S. Appl. No. 11/530,807; 15 pages.
Letter re: Bang & Olufsen a/s by David Safran, Nixon Peabody, LLP May 21, 2004.
Luna Technologies International, Inc., Luna Photoluminescent Safety Products, "Photoluminescence-What is Photoluminescence?" from website at http://www.lunaplast.com/photoluminescence.com on Dec. 27, 2005.
Marriott et al., U.S. Office Action mailed Dec. 12, 2006, directed to U.S. Appl. No. 10/722,948; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Jun. 2, 2006, directed to U.S. Appl. No. 10/722,948; 12 pages.
Mims, Forrest M., III, "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
Prest et al., U.S. Appl. No. 60/850,662 filed Oct. 11, 2006, entitled, "Capacitive Scroll Wheel"; 21 pages.
Rathnam et al., U.S. Appl. No. 60/992,056 filed Dec. 3, 2007, entitled, "Scroll Wheel Circuit Arrangements and Methods of Use Thereof"; 42 pages.
Rathnam et al., U.S. Appl. No. 61/017,436 filed Dec. 28, 2007, entitled, "Multi-Touch Scroll Wheel Circuit Arrangements and Processing Methods"; 58 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jan. 18, 2007, directed to U.S. Appl. No. 10/259,159; 18 pages.
Robbin et al., U.S. Office Action mailed Jun. 16, 2005, directed to U.S. Appl. No. 10/259,159; 16 pages.
Robbin et al., U.S. Office Action mailed Oct. 13, 2006, directed to U.S. Appl. No. 10/259,159; 18 pages.
Robbin et al., U.S. Office Action mailed Sep. 30, 2004, directed to U.S. Appl. No. 10/259,159; 14 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Robbin, U.S. Appl. No. 60/346,237 entitled, "Method and System for List Scrolling," filed Oct. 22, 2001; 12 pages.
Rothkopf, U.S. Appl. No. 60/935,854 titled "Compact Media Players," filed Sep. 4, 2007; 36 pages.
SanDisk Sansa Connect User Guide; 29 pages, (2007).
Soderholm, Lars G., "Sensing Systems for 'Touch and Feel,'" Design News (May 8, 1989): pp. 72-76.
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Sylvania, "Intellvision™ Intelligent Television Master Component Service Manual," pp. 1, 2 and 8, 1979.
Tessler, Franklin, "Point Pad," Macworld 12(10) (Oct. 1995).
Tessler, Franklin, "Smart Input: How to Chose from the New Generation of Innovative Input Devices," Macworld 13(5) (May 1996).
Tessler, Franklin, "Touchpads," Macworld 13(2) (Feb. 1996).
Translation of Trekstor's Defense Statement to the District Court Mannheim of May 23, 2008; 37 pages.
Tsuk et al., U.S. Office Action mailed Aug. 3, 2006, directed to U.S. Appl. No. 10/256,716; 15 pages.
Tsuk et al., U.S. Office Action mailed Aug. 7, 2009, directed to U.S. Appl. No. 11/610,181; 20 pages.
Tsuk et al., U.S. Office Action mailed Jan. 10, 2006, directed to U.S. Appl. No. 10/256,716; 12 pages.
Tsuk et al., U.S. Office Action mailed Jul. 7, 2009, directed to U.S. Appl. No. 11/610,190; 24 pages.
Tsuk et al., U.S. Office Action mailed Jun. 24, 2005, directed to U.S. Appl. No. 10/256,716; 12 pages.
Tsuk et al., U.S. Office Action mailed Oct. 13, 2006, directed to U.S. Appl. No. 10/256,716; 16 pages.
Tsuk et al., U.S. Office Action mailed Sep. 30, 2004, directed to U.S. Appl. No. 10/256,716; 11 pages.
Weber et al., U.S. Appl. No. 61/020,531 filed Jan. 11, 2008 entitled "Modifiable Clickwheel Text"; 11 pages.
Weber et al., U.S. Appl. No. 61/025,531 filed Feb. 1, 2008 entitled "Co-Extruded Materials and Methods"; 11 pages.
Zadesky et al, U.S. Office Action mailed Aug. 19, 2008, directed to U.S. Appl. No. 11/057,050; 23 pages.
Zadesky et al., U.S. Office Action mailed Aug. 6, 2009, directed to U.S. Appl. No. 11/057,050; 30 pages.
Zadesky et al., U.S. Office Action mailed Dec. 12, 2007, directed to U.S. Appl. No. 10/643,256; 12 pages.
Zadesky et al., U.S. Office Action mailed Dec. 24, 2008, directed to U.S. Appl. No. 11/057,050; 25 pages.
Zadesky et al., U.S. Office Action mailed Feb. 20, 2009, directed to U.S. Appl. No. 11/057,050; 25 pages.
Zadesky et al., U.S. Office Action mailed Jul. 13, 2007, directed to U.S. Appl. No. 10/643,256; 13 pages.

Zadesky et al., U.S. Office Action mailed Jul. 30, 2004, directed to U.S. Appl. No. 10/188,182; 7 pages.
Zadesky et al., U.S. Office Action mailed Jul. 9, 2008, directed to U.S. Appl. No. 10/643,256; 12 pages.
Zadesky et al., U.S. Office Action mailed Mar. 23, 2007, directed to U.S. Appl. No. 10/643,256; 11 pages.
Zadesky et al., U.S. Office Action mailed Mar. 4, 2004, directed to U.S. Appl. No. 10/188,182; 8 pages.
Zadesky et al., U.S. Office Action mailed Mar. 5, 2009, directed to U.S. Appl. No. 11/477,469; 12 pages.
Zadesky et al., U.S. Office Action mailed Nov. 20, 2007, directed to U.S. Appl. No. 11/057,050; 33 pages.
Zadesky et al., U.S. Office Action mailed Nov. 26, 2008, directed to U.S. Appl. No. 11/057,050; 25 pages.
Zadesky et al., U.S. Office Action mailed Oct. 27, 2006, directed to U.S. Appl. No. 10/643,256; 14 pages.
Zadesky et al., U.S. Office Action mailed Oct. 4, 2007, directed to U.S. Appl. No. 11/386,238; 12 pages.
Zadesky et al., U.S. Office Action mailed Sep. 21, 2005, directed to U.S. Appl. No. 10/188,182; 10 pages.
Zadesky et al., U.S. Appl. No. 60/359,551 entitled "Touchpad for Handheld Device," filed Feb. 25, 2002; 34 pages.
Zadesky et al., U.S. Appl. No. 60/714,609 entitled "Scrolling Input Arrangements Using Capacitive Sensors on a Flexible Membrane," filed Sep. 6, 2005; 17 pages.
Zadesky et al.., U.S. Office Action mailed Oct. 4, 2007, directed to U.S. Appl. No. 11/806,957; 14 pages.
Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Tsuk et al., U.S. Office Action mailed Dec. 31, 2009, directed to U.S. Appl. No. 11/610,190; 25 pages.
Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Interlink Electronics, VersaPad: Integration Guide, © 1998 (VersaPad), pp. 1-35.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.

SanDisk Sansa Connect User Guide, 2007; 29 pages.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Ng et al., U.S. Office Action mailed Jul. 8, 2010, directed to U.S. Appl. No. 11/882,423; 19 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.

* cited by examiner

CENTER BUTTON ISOLATION RING

PRIORITY CLAIM TO PROVISIONAL APPLICATION

A claim for priority is hereby made under the provisions of 35 U.S.C. § 119 for the present application based upon U.S. Provisional Application No. 60/725,841, filed on Oct. 11, 2005, which is incorporated herein by reference.

BACKGROUND

Portable electronic devices have continued to evolve with developing computing technologies. Reductions in size of computing components have given rise to a proliferation of multi-use devices that may be easily transported while maintaining robust feature sets. For example, a personal digital assistant (PDA) is a handheld device that combines computing, telephone/fax, Internet, and networking features. Unlike portable computing devices, a PDA is generally configured to utilize a stylus or a user finger for input. In other examples, portable electronic devices may be highly specialized featuring a compact profile with equally compact user input controls.

For example, the IPOD® as developed by APPLE® is a full featured portable electronic music device as in FIG. 1. FIG. 1 is an illustrative representation of a portable electronic music device 100. A user may store and play any number of musical selections using device 100. In some examples, a screen 114 may be provided that may be utilized as a graphical user interface. A selection wheel 110 may provide any number of selection wheel controls such as: menu selection 102; forward search selection 104; play/pause selection 106; and backward search selection 108. These selections may be configured to provide a user friendly and efficient interface. In this example, a player control may be defined by an area that may be pressed to actuate an underlying switch. In some examples, a center button 112 having an underlying center button switch may be provided for additional selections. Further, a port 116 may be used for I/O functions as well as charging functions. Legend arrows 150 are provided for clarity. As illustrated, portable electronic music device 100 is configured with a simplified user interface having only four selection wheel controls (102-108) and one center button 112.

In early models of this type of portable electronic music device, devices were large enough to accommodate a relatively large selection wheel and correspondingly large area for player controls. However, as device profiles have continued to shrink, so have user interfaces. Thus, areas designated for player controls have continued to shrink causing users, in some examples, to inadvertently actuate a center button switch when making a player control selection thereby causing unexpected results.

For example, FIG. 2 is an illustrative cross-sectional representation of a selection pad 204 and selection button 202. At initial rest position 200, switches 206, 208, and 210 are not actuated. Selection button 202 may be utilized to select switch 208 while selection pad 204 may be configured to actuate switches 206 and 210 via actuator nubs 214 and 212, respectively. In a first actuating position 250, a force 220 may be applied to selection pad 204 at or near the location of switch 210. As can be appreciated, deflection of selection pad 204 may, in some examples, cause a partial deflection of selection button 202 which partially actuates switch 208. Typically these arrangements may be configured to accept some degree of deflection of selection button without actuating switch 208. Thus, a compromise between a responsive selection button that is resistant to mechanical cross-talk may be achieved. However, when a force 230 is applied at second actuating position 260, a different result may occur. In this position, force 230 is applied closer to selection button 202 actuating not only switch 210, but switch 208 as well. In this example, when both switches are actuated, mechanical cross-talk may occur thus leading to unexpected results. This problem is exacerbated as device profile shrinks. Therefore, selection button isolation arrangements are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, selection button isolation arrangements for use with electronic devices are presented including: a selection pad forming a substantially planar surface disposed about a first axis, the selection pad having a pad top surface, the pad top surface configured to receive a user input, the selection pad configured to actuate a number of switches; a selection button substantially co-located with and disposed about the first axis for actuating a selection button switch, the selection button configured to receive a user input; and an annular isolation ring disposed about the first axis having a standoff for mechanically isolating the selection button such that the selection button switch is not actuated by the first user input. In some embodiments, the selection pad includes: a base layer for providing mechanical support, the base layer configured with a number of actuator nubs for actuating the plurality of switches; and a finish surface layer forming the pad top surface for providing a number of user input indicators. In some embodiments, the user input indicators are selected from the group consisting of: a menu selection, a play selection, a pause selection, a forward search selection, a backward search selection, and a stop selection.

In other embodiments, selection button isolation arrangements for use with electronic devices are presented including: a selection pad forming a substantially planar surface, the selection pad having a pad top surface, the pad top surface configured to receive a user input, the selection pad configured to actuate a number of switches; a selection button substantially coplanar with the selection pad for actuating a selection button switch wherein the selection button is proximate to at least one of the plurality of switches, the selection button configured to receive a user input; and an isolation barrier for mechanically isolating the selection button such that the selection button switch is not actuated by user input directed to the selection pad. In some embodiments, the selection pad includes: a base layer for providing mechanical support, the base layer configured with a plurality of actuator nubs for actuating the plurality of switches; and a finish surface layer forming the pad top surface for providing a plurality of user input indicators.

In other embodiments, selection button isolation arrangements for use with a portable electronic music devices are presented including: a selection pad forming a substantially planar surface disposed about an axis, the selection pad having a pad top surface, the pad top surface configured to receive a user input, the selection pad configured to actuate a number of switches wherein the selection pad includes, a base layer for providing mechanical support, the base layer configured with a number of actuator nubs for actuating the number of switches, and a finish surface layer forming the pad top surface for providing a number of user input indicators; a selection button substantially co-located with and disposed about the axis for actuating a selection button switch, the selection button configured to receive another user input wherein the selection button includes, a button actuator nub for actuating the selection button switch, and an indent for providing a capturing element such that the annular isolation ring captures the selection button; and an annular isolation ring disposed about the first axis having a standoff for mechanically isolating the selection button such that the selection button switch is not actuated by the user input directed to the selection pad.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 3:
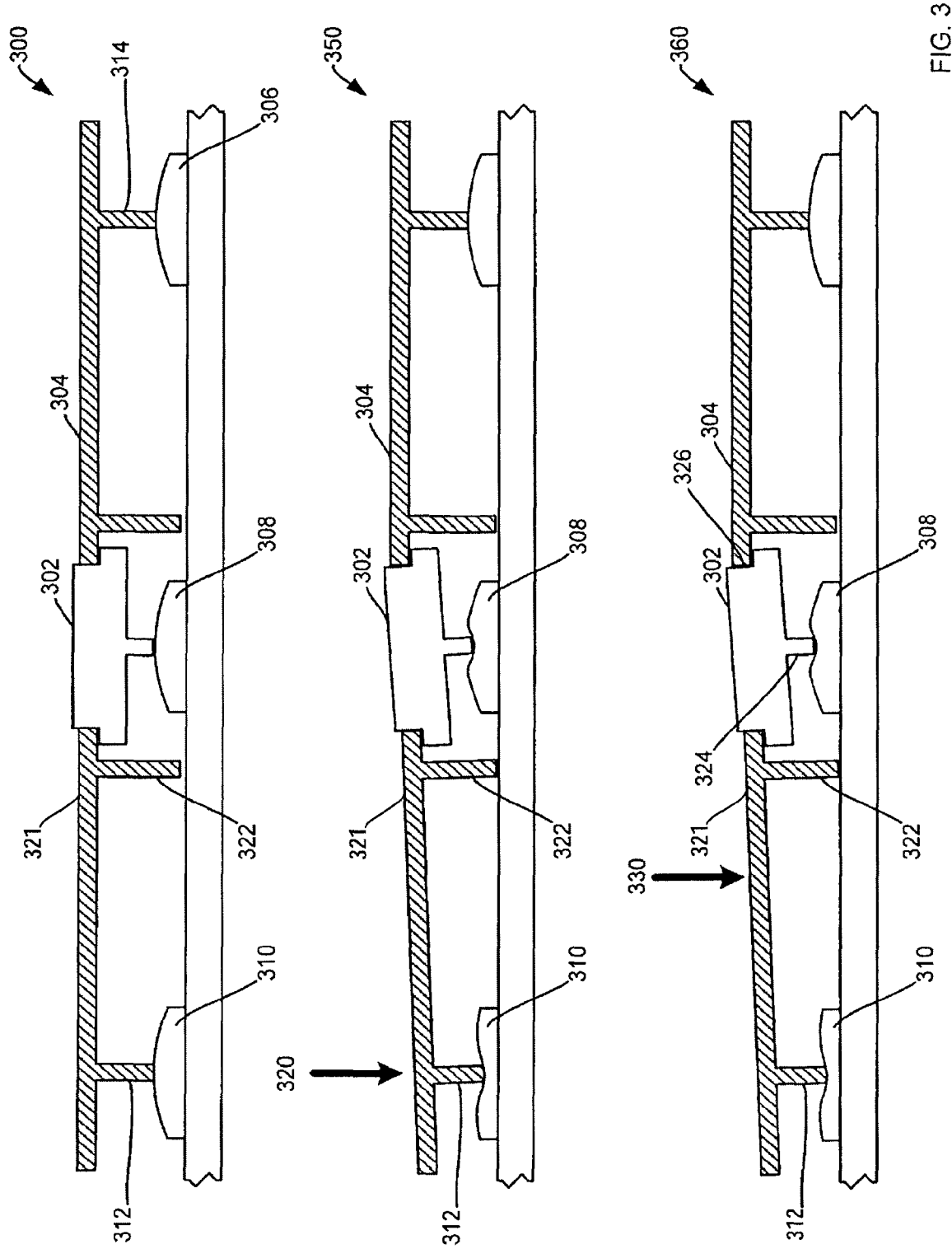
FIG. 3 is an illustrative cross-sectional representation of a selection pad and selection button in accordance with an embodiment of the present invention.

FIG. 3 is an illustrative cross-sectional representation of a selection pad 304 and selection button 302 in accordance with an embodiment of the present invention. At initial rest position 300, switches 306-310 are not actuated. Selection button 302 may be utilized to select switch 308 while selection pad 304, which includes a pad top surface, may be configured to actuate switches 306 and 310 via actuator nubs 314 and 312, respectively. In a first actuating position 350, a force 320 may be applied to selection pad 304 at or near the location of switch 310. Force 320 is transmitted through actuator nub 312 to actuate switch 310. As can be appreciated, deflection of selection pad 304 may, in some examples, cause a partial deflection of selection button 302 which partially actuates switch 308. However, an annular isolation ring 321 having a standoff 322 may be utilized to limit travel of center button 302. While prior art solutions may be configured to accept some degree of deflection of selection button without actuating switch 308, annular isolation ring 321 may be configured to provide an absolute limit of selection button deflection.

Figure 1:
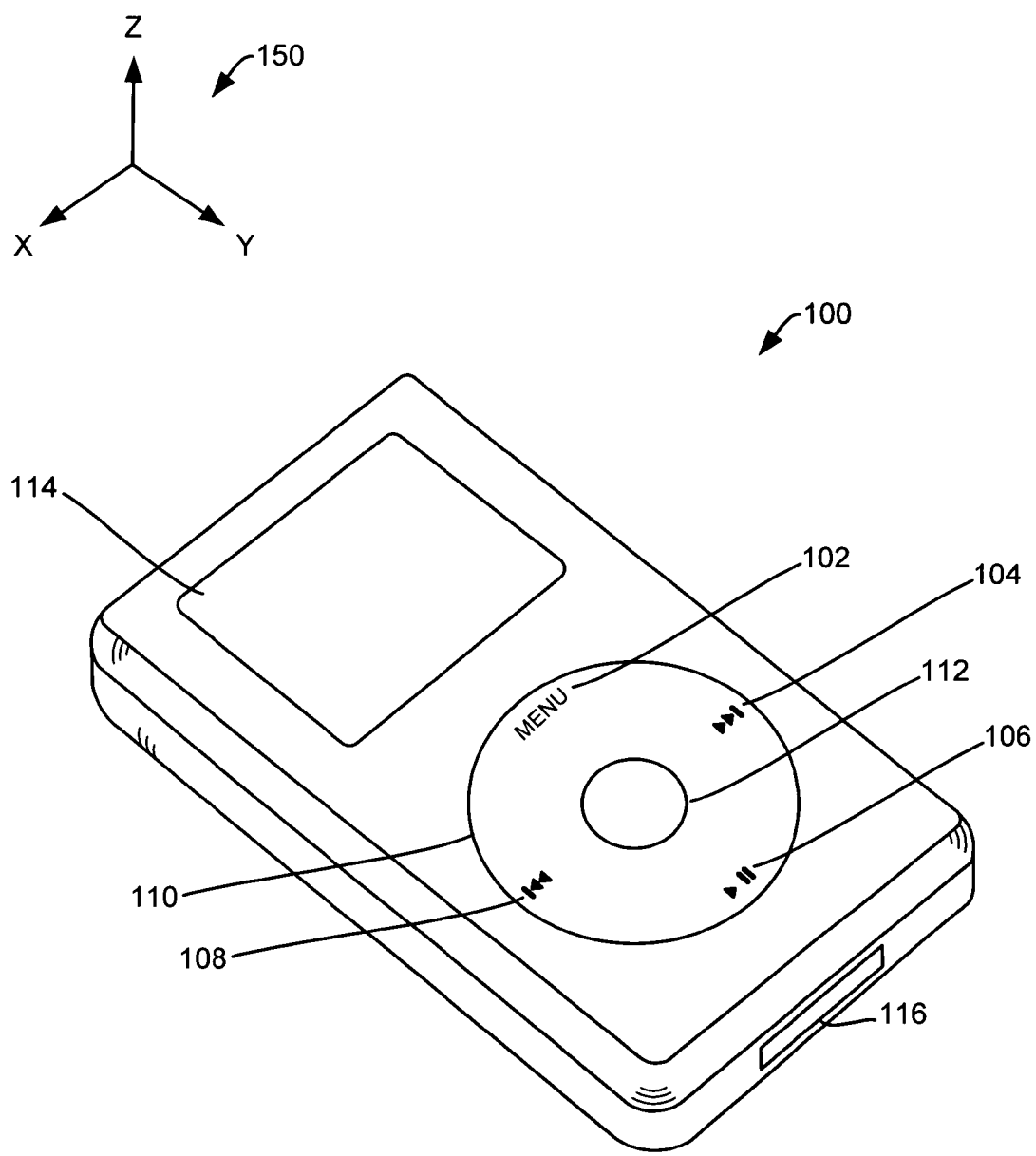
FIG. 1 is an illustrative representation of a portable electronic music device.
Figure 2:
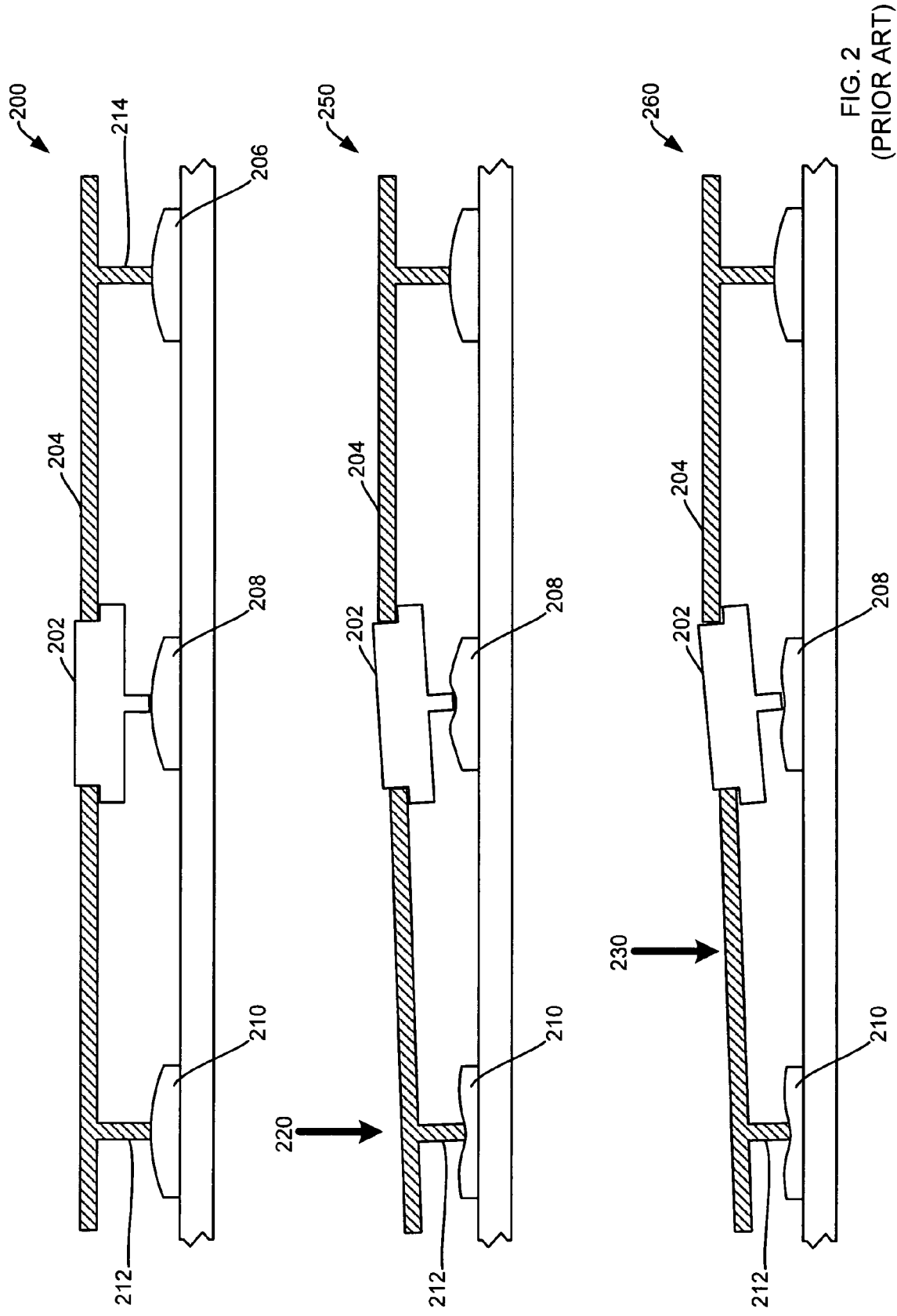
FIG. 2 is an illustrative cross-sectional representation of a selection pad and selection button.

When a force 330 is applied at second actuating position 360, unlike force 230 (FIG. 2), selection button 302 is limited in deflection because annular isolation ring 321 provides a mechanical limit for any deflection. Thus, mechanical cross-talk, as discussed above, may be reduced or eliminated. Furthermore, selection button 302 may be configured to be even more responsive to user input (i.e. button actuator nub 324 may be configured in tighter tolerance with respect to switch 308) with little or no mechanical cross-talk. In some embodiments, selection button 302 may be configured with indent 326 that provides a capturing element such that annular isolation ring 321 may capture selection button 302. In other embodiments, annular isolation ring 321 may be non-contiguous. That is, annular isolation ring 321 may be segmented in some embodiments without departing from the present invention.

Figure 4:
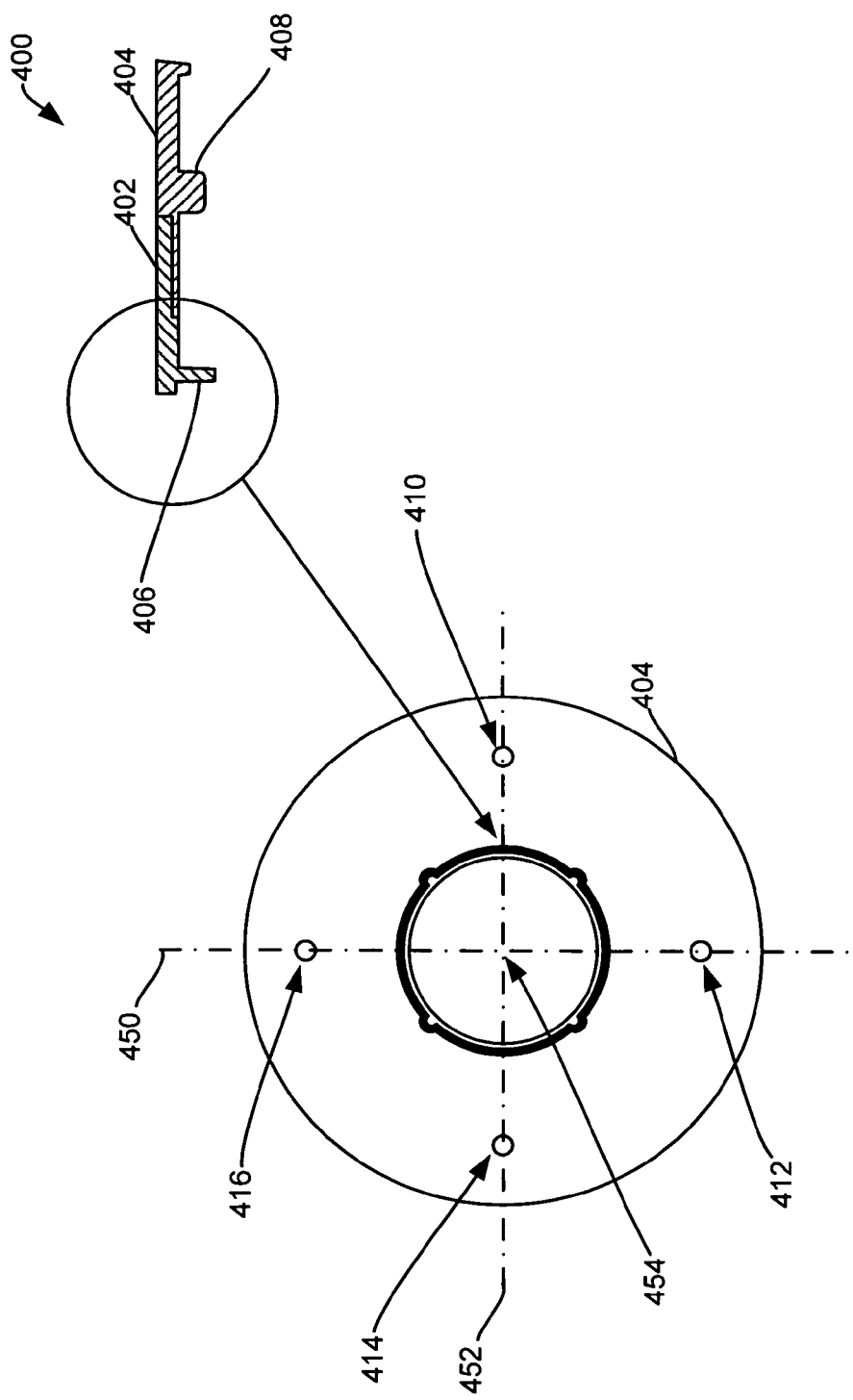
FIG. 4 is an illustrative top and cross-sectional representation of a selection button isolation arrangement in accordance with an embodiment of the present invention.

FIG. 4 is an illustrative top and cross-sectional representation of a selection button isolation arrangement 400 in accordance with an embodiment of the present invention. Selection isolation arrangement 400 includes a selection pad 404 having a pad top surface for receiving user input. Selection pad 404 may be further configured with a number of layers: a base layer (not shown) and a finish surface layer (not shown). A base layer provides mechanical support for the selection pad. A base layer may be composed of any of a number of sufficiently rigid materials well known in the art. In some embodiments, a polymeric compound may be utilized. Additionally, polymeric compounds may provide some insulating properties for a selection pad. Any suitable polymeric compound having sufficient strength to weight ratio may be utilized without departing from the present invention. A finish layer provides graphical representation of user controls called user input indicators. Any number of user input indicators may be utilized. In embodiments where an electronic device is a portable music device, like, for example, an IPOD®, user input indicators like menu selection; play selection; pause selection; forward search selection; backward search selection; and stop selection may be utilized without departing form the present invention. User input indicators may be co-located with switches 410, 412, 414, and 416 as discussed above. Thus, in one embodiment, to make a menu selection, a user may apply a force upon a user input indicators using a stylus, for example. The force applied is transmitted through an actuator nub 408 which actuates switch 410.

As noted above, forces applied in this manner may, in some prior art solutions, actuate a selection button. However, in the present invention, an annular isolation ring 402 may limit movement due to an applied force so that a selection button is not actuated inadvertently. A standoff 406 is configured such that movement due to a downward force is limited. Standoff 406 may be disposed substantially perpendicular to pad top surface of selection pad 404. In some embodiments, annular isolation ring 402 is mechanically integrated with selection pad 404. Annular isolation ring 402 and selection pad 404 may be mechanically integrated in any manner well known in the art including, for example, gluing and welding without departing from the present invention. Further, as illustrated, annular isolation ring 402 may be disposed about axis 454 as defined by center lines 450 and 452 where axis 454 is disposed substantially perpendicular to annular isolation ring 402 and selection pad 404. Thus, in the illustrated example, annular isolation ring 402 is circular. Still further, standoff 406 may or may not be contiguous. That is, standoff 406 may be segmented in some embodiments. As can be appreciated, drawings are not necessarily to scale and are for illustrative clarity only. No limitations as to dimensions should be construed from the illustrations presented.

Figure 5A:
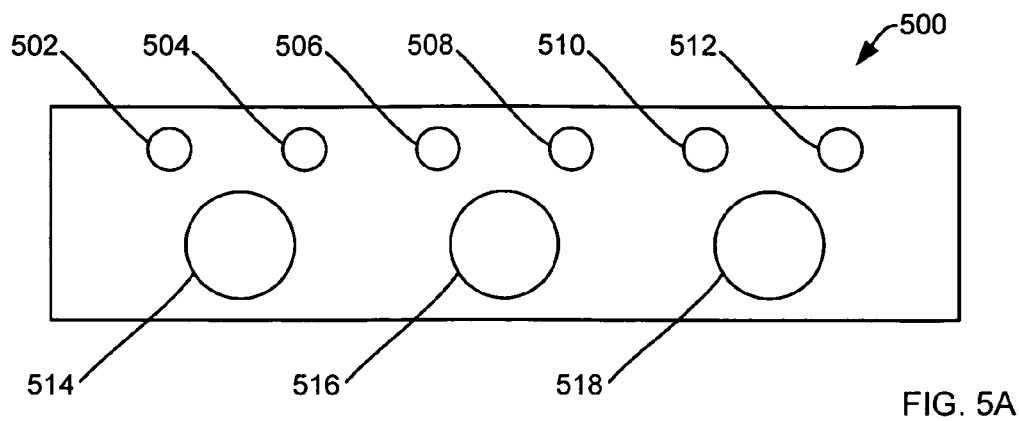
FIGS. 5A-C are illustrative representations of configurations of selection pads in accordance with embodiments of the present invention.
Figure 5B:
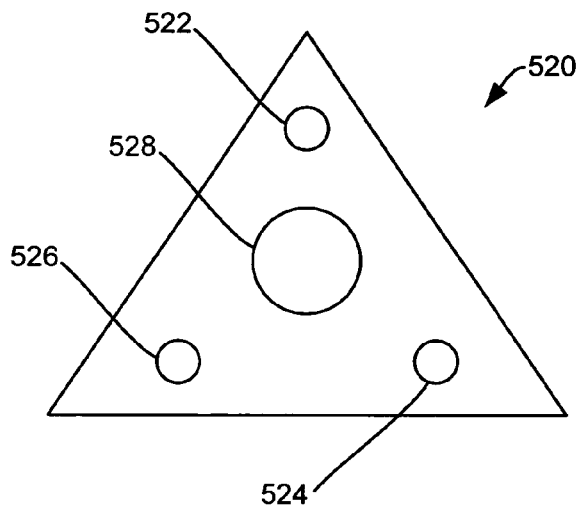
Figure 5C:
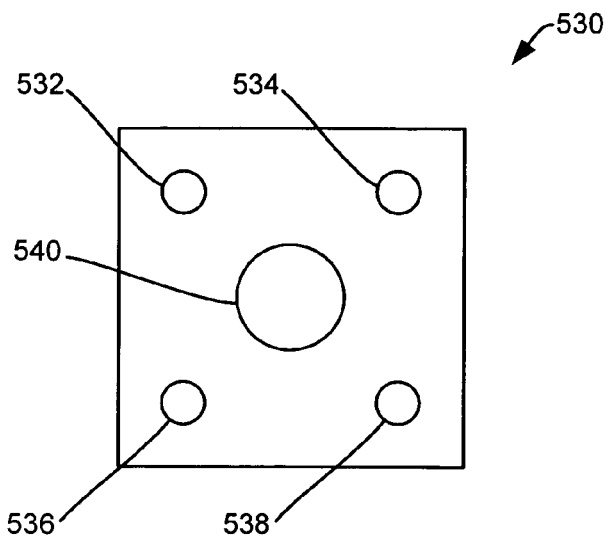

FIGS. 5A-C are illustrative representations of configurations of selection pads in accordance with embodiments of the present invention. FIG. 5A illustrates a selection pad arrangement 500 for actuating a plurality of switches 502, 504, 506, 508, 510, and 512 and having multiple selection buttons 514, 516, and 518. In this arrangement, embodiments of the present invention minimize mechanical cross-talk between switches 502, 504, 506, 508, 510, and 512 of a selection pad and multiple selection buttons 514, 516, and 518. FIG. 5B illustrates a selection pad arrangement 520 for actuating a plurality of switches 522, 524, and 526 and a single center selection button 528 in a triangular configuration. In this arrangement, embodiments of the present invention minimize mechanical cross-talk between switches 522, 524, and 526 of a selection pad and center selection button 528. FIG. 5C illustrates a selection pad arrangement 530 for actuating a plurality of switches 532, 534, 536, and 538 and a single center selection button 540 in a rectangular configuration. In this arrangement, embodiments of the present invention minimize mechanical cross-talk between switches 532, 534, 536, and 538 of a selection pad and center selection button 540.

As may be appreciated any number of configurations may be achieved in embodiments of the present invention. In addition to the configurations illustrated, a quadrilateral, a pentagon, a hexagon, an octagon, a free form shape, an ovate shape, and other shapes may be utilized without departing from the present invention. As such, any illustrative shape should not be considered limiting. As may be appreciated, in some embodiments, selection button isolation arrangements may be configured as a free form isolation barrier. That is, isolation ring (i.e. isolation barrier) embodiments as described above need not be annular. Indeed, isolation barrier may conform to any shape as defined by a center selection button without departing from the present invention.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A selection button isolation arrangement for use with an electronic device comprising:
    a selection pad having a pad top surface, the pad top surface configured to receive a first user input and a second user input;
    a plate;
    a first switch disposed on the plate;
    a first actuator disposed between the pad top surface and the first switch for transmitting the first user input to the first switch;
    a second switch disposed on the plate;
    a second actuator disposed between the pad top surface and the second switch for transmitting the second user input to the second switch;
    a selection button surrounded by the selection pad, the selection button configured to receive a third user input;
    a third switch disposed on the plate;
    a third actuator disposed between the selection button and the third switch for transmitting the third user input to the third switch; and
    a standoff disposed between the pad top surface and the plate, the standoff surrounding the third actuator, the standoff being disposed between the first actuator and the second actuator, and the standoff being configured to prevent actuation of the third switch by the first user input or the second user input.

2. The arrangement of claim 1 wherein the selection pad comprises:
    a base layer for providing mechanical support, the base layer configured with a plurality of actuator nubs for actuating the plurality of switches; and
    a finish surface layer forming the pad top surface for providing a plurality of user input indicators.

3. The arrangement of claim 2 wherein the plurality of user input indicators are selected from the group consisting of: a menu selection, a play selection, a pause selection, a forward search selection, a backward search selection, and a stop selection.

4. The arrangement of claim 1 further comprising an annular isolation ring surrounding the selection button and surrounded by the selection pad, wherein the standoff is part of the annular isolation ring, and the selection button comprises an indent for providing a capturing element such that the annular isolation ring captures the selection button.

5. The arrangement of claim 1 further comprising an annular isolation ring surrounding the selection button and surrounded by the selection pad, wherein the annular isolation ring is mechanically integrated with the standoff.

6. The arrangement of claim 1 wherein the electronic device is a portable music device.

7. The arrangement of claim 1 wherein the selection pad has a rectangular shape.

8. The arrangement of claim 1 further comprising an annular isolation ring surrounding the selection button and surrounded by the selection pad, wherein the standoff is part of the annular isolation ring, and the annular isolation ring is non-contiguous.

9. An arrangement for use with an electronic device comprising:
    a selection pad having a pad top surface, the pad top surface configured to receive a first user input;
    a plate;
    a first switch disposed on the plate;
    a first actuator disposed between the pad top surface and the first switch for transmitting the first user input to the first switch;
    a selection button configured to receive a second user input;
    a second switch disposed on the plate;
    a second actuator disposed between the selection button and the second switch for transmitting the second user input to the second switch; and
    a standoff disposed between the pad top surface and the plate, the standoff being disposed between the first actuator and the second actuator, and the standoff being configured to prevent actuation of the second switch by the first user input.

10. The arrangement of claim 9 wherein the selection pad comprises:
    a base layer for providing mechanical support, the base layer configured with a plurality of actuator nubs for actuating the plurality of switches; and
    a finish surface layer forming the pad top surface for providing a plurality of user input indicators.

11. The arrangement of claim 10 wherein the plurality of user input indicators are selected from the group consisting of: a menu selection, a play selection, a pause selection, a forward search selection, a backward search selection, and a stop selection.

12. The arrangement of claim 9 further comprising an isolation barrier, wherein the standoff is part of the isolation barrier, and the selection button comprises an indent for providing a capturing element such that the isolation barrier captures the selection button.

13. The arrangement of claim 9 further comprising an isolation barrier, wherein the standoff is part of the isolation barrier, and the isolation barrier is non-contiguous.

14. The arrangement of claim 9 wherein the selection pad is formed into a shape selected from the group consisting of: a triangle, a quadrilateral, a pentagon, a hexagon, an octagon, a free form shape, and an ovate shape.

15. An arrangement for use with a portable electronic music device comprising:
- a selection pad having a pad top surface, the pad top surface configured to receive a first user input;
- a plate;
- a first switch disposed on the plate;
- a first actuator disposed between the pad top surface and the first switch for transmitting the first user input to the first switch;
- a selection button configured to receive a second user input;
- a second switch disposed on the plate;
- a second actuator disposed between the selection button and the second switch for transmitting the second user input to the second switch; and
- a standoff disposed between the pad top surface and the plate, the standoff being disposed between the first actuator and the second actuator, and the standoff being configured to prevent actuation of the second switch by the first user input.

16. The arrangement of claim 15 further comprising a plurality of user input indicators disposed on the pad top surface, wherein the plurality of user input indicators are selected from the group consisting of: a menu selection, a play selection, a pause selection, a forward search selection, a backward search selection, and a stop selection.

17. The arrangement of claim 15 further comprising an annular isolation ring surrounding the selection button and surrounded by the selection pad, wherein the annular isolation ring is mechanically integrated with the standoff.

18. The arrangement of claim 15 wherein the selection pad has a triangular shape.

19. The arrangement of claim 15 further comprising an annular isolation ring surrounding the selection button and surrounded by the selection pad, wherein the standoff is part of the annular isolation ring, and the annular isolation ring is non-contiguous.

* * * * *

UNITED STATES PATENT AND TRADEMARK OFFICE
CERTIFICATE OF CORRECTION

| | | |
|---|---|---|
| PATENT NO. | : 7,880,729 B2 | Page 1 of 1 |
| APPLICATION NO. | : 11/499360 | |
| DATED | : February 1, 2011 | |
| INVENTOR(S) | : Brian Lynch et al. | |

It is certified that error appears in the above-identified patent and that said Letters Patent is hereby corrected as shown below:

On page 6, under "Other Publications", in column 1, line 2, delete "gentily" and insert -- gently --, therefor.

On page 6, under "Other Publications", in column 1, line 8, delete "retreived" and insert -- retrieved --, therefor.

On page 6, under "Other Publications", in column 1, line 14, delete "gamingmuseunn" and insert -- gamingmuseum --, therefor.

On page 6, under "Other Publications", in column 2, line 66, delete "Grahics" and insert -- Graphics --, therefor.

On page 7, under "Other Publications", in column 1, line 21, delete "promies?"" and insert -- promise?" --, therefor.

On page 7, under "Other Publications", in column 2, line 35, delete ""Intellvision™" and insert -- "Intellivision™ --, therefor.

In column 4, line 39, delete "form" and insert -- from --, therefor.

Signed and Sealed this
First Day of November, 2011

David J. Kappos
*Director of the United States Patent and Trademark Office*